(12) United States Patent
Suzuki et al.

(10) Patent No.: US 11,331,975 B2
(45) Date of Patent: May 17, 2022

(54) VEHICULAR AIR CONDITIONING DEVICE

(71) Applicant: KEIHIN CORPORATION, Tokyo (JP)

(72) Inventors: Hiroto Suzuki, Utsunomiya (JP); Kenji Tanaka, Sakura (JP); Yasunori Takahashi, Utsunomiya (JP)

(73) Assignee: KEIHIN CORPORATION, Tokyo (JP)

( * ) Notice: Subject to any disclaimer, the term of this patent is extended or adjusted under 35 U.S.C. 154(b) by 117 days.

(21) Appl. No.: 16/804,642

(22) Filed: Feb. 28, 2020

(65) Prior Publication Data

US 2020/0282795 A1  Sep. 10, 2020

(30) Foreign Application Priority Data

Mar. 6, 2019 (JP) .............................. JP2019-040564

(51) Int. Cl.
*B60H 1/00* (2006.01)

(52) U.S. Cl.
CPC ..... *B60H 1/00021* (2013.01); *B60H 1/00514* (2013.01); *B60H 1/00007* (2013.01); *B60H 1/00064* (2013.01); *B60H 2001/002* (2013.01); *B60H 2001/00114* (2013.01)

(58) Field of Classification Search
CPC ............ B60H 1/00021; B60H 1/00514; B60H 2001/00114; B60H 2001/002; B60H 1/00064; B60H 1/00007; B60H 1/00564
See application file for complete search history.

(56) References Cited

U.S. PATENT DOCUMENTS

2019/0389273 A1* 12/2019 Salazar .............. B60H 1/00564

FOREIGN PATENT DOCUMENTS

| JP | 2011-207278 | 10/2011 |
|---|---|---|
| JP | 2018-122630 | 8/2018 |

* cited by examiner

*Primary Examiner* — Lionel Nouketcha
(74) *Attorney, Agent, or Firm* — Rankin, Hill & Clark LLP

(57) ABSTRACT

An air conditioning case configuring a vehicular air conditioning device is configured from first through third case sections capable of being divided in a width direction, the third case section in a center in the width direction and the first case section being connected via a first dividing section, and the third case section and the second case section being connected via a second dividing section. Moreover, the first and second dividing sections are formed in such a manner that their lower section sides facing a lower passage divided in a space between an evaporator and a heating unit are positioned on outer sides in the width direction with respect to an upper section of the air conditioning case provided with a vent blast port blasting air into a vehicle interior.

5 Claims, 4 Drawing Sheets

VEHICULAR AIR CONDITIONING DEVICE

CROSS-REFERENCE TO RELATED APPLICATION

This application is based upon and claims the benefit of priority from Japanese Patent Application No. 2019-040564 filed on Mar. 6, 2019, the contents of which are incorporated herein by reference.

BACKGROUND OF THE INVENTION

Field of the Invention

The present invention relates to a vehicular air conditioning device that is installed in a vehicle, and that blasts into a vehicle interior air that has undergone temperature adjustment by a heat exchanger in an air conditioning case.

Description of the Related Art

Conventionally, in a vehicular air conditioning device installed in a vehicle, an air conditioning case configured from a divided case able to be divided in a width direction has been employed, and in recent years, attempts have been made to reduce manufacturing costs by multi-purposely using part of the divided case when manufacturing air conditioning cases whose sizes differ.

An air conditioning case disclosed in Japanese Laid-Open Patent Publication No. 2011-207278, for example, is configured able to be divided in three in the width direction from a pair of case members and an intermediate case member, and copes by multi-purposely using the case members disposed on outer sides in the width direction, and exchanging the intermediate case member provided at a center in the width direction for ones having widths that differ according to the sizes of the air conditioning cases required. As a result, it becomes possible for part of the air conditioning case to be multi-purposely used, and a reduction in manufacturing costs is achieved.

On the other hand, in a vehicular air conditioning device, sometimes, in the air conditioning case, a downstream side passage of a cooler is divided upwardly/downwardly into an upper passage and a lower passage, and the upper passage that blasts air to a vicinity of a face in front seats of the vehicle interior and to a front window is divided into a driver seat side and a passenger seat side, and the lower passage that blasts air to a vicinity of feet in the front seats is similarly divided into a driver seat side and a passenger seat side.

In a vehicular air conditioning device of Japanese Laid-Open Patent Publication No. 2018-122630 of the above-mentioned kind, a rear seat passage enabling a blast of air to a rear seat side of the vehicle interior is further provided at a center of the lower passage in the case, and air-mix doors for changing a mixing ratio of cool air and warm air and performing temperature adjustment are provided so as to be sandwiched by the case for each of the passages. Moreover, regarding a left/right pair of air-mix doors provided to the upper passage divided in two, and an air-mix door disposed in the rear seat passage in the center in the width direction and performing temperature adjustment on a rear seat side, of the lower passage divided in three, shared usage of these air-mix doors, being assumed to be the same, is often attempted.

SUMMARY OF THE INVENTION

However, in the above-mentioned kind of vehicular air conditioning device, when it is attempted to share usage of all of cases differing in presence/absence of a function for temperature adjustment of the blast of air to the rear seat passage or differing in size, if fitting surfaces of the pair of case members provided on outer sides in the width direction and the intermediate case member are assumed to be in a straight line between the upper passage and the lower passage, then passage configurations of the lower passage or quantities and widths of the air-mix doors differ, hence a shape of the case gets complicated, contrarily leading to an increase in manufacturing man-hours and manufacturing costs.

Specifically, when, as in a vehicular air conditioning device of Japanese Laid-Open Patent Publication No. 2011-207278, a partitioning member partitioning a center face opening that blasts air to a front seat center, and a side face opening that blasts air to a front seat side section are formed in the intermediate case member, there is a problem that regarding the center face opening whose periphery is surrounded by a single case member, a seal surface contacting a door that opens/closes the opening is difficult to form, and when it is attempted to secure sealing ability, a structure of the center face opening gets complicated.

A general object of the present invention is to provide a vehicular air conditioning device that can achieve shared usage of a case in a variety of specifications by a simple configuration, and that enables manufacturing man-hours and manufacturing costs to be reduced.

An aspect of the present invention is a vehicular air conditioning device that comprises an air conditioning case, the air conditioning case including a passage where air flows, and including a cooler and a heater housed therein so as to face the passage, the air conditioning case being formed to be dividable in a width direction of the cooler orthogonal to a flowing direction of the air, and being configured from: first and second cases configuring both ends in the width direction of the air conditioning case; and a third case sandwiched between the first case and the second case, a space between the cooler and the heater in the air conditioning case being divided into an upper passage and a lower passage, an opening that communicates downstream of the upper passage and a vehicle interior and that is formed in an upper section of the air conditioning case so as to extend over the first case, the second case, and the third case, the opening being provided with a mode switching door configured to open/close, the opening being partitioned in the width direction and forming a pair of outer openings and a central opening, by partitioning members provided in the first and second cases, and fitting positions of the first and second cases with the third case facing the lower passage, being on outer sides in the width direction, with respect to fitting positions of the first and second cases with the third case in the opening.

Due to the present invention, in an air conditioning case configured from first through third cases capable of being divided in a width direction, an opening communicating downstream of an upper passage and a vehicle interior is formed in an upper section of the air conditioning case so as to extend over the first case, the second case, and the third case, the opening being partitioned in the width direction by partitioning members provided to the first and second cases and having formed therein a pair of outer openings and a central opening. Moreover, fitting positions of the first and second cases and the third case facing a lower passage is formed so as to be on outer sides in the width direction with respect to fitting positions of the first and second cases and the third case in the opening.

Therefore, since the upper passage has the first through third cases divided at positions on inner sides in the width direction with respect to the partitioning members of the outer openings provided to the first and second cases on outer sides in the width direction, opening areas of the outer openings can be broadly secured regardless of size of the case.

Moreover, even in the case where there is shared usage of the first and second cases, and, for example, a mode switching door that is applied to a vehicular air conditioning device having a rear seat temperature adjustment function for adjusting temperature of air blasted to a rear seat, and is for performing the temperature adjustment of the rear seat has been provided in a position facing the lower passage of the third case, by a simple configuration of fitting positions for sandwiching the mode switching doors being formed beforehand in positions on outer sides in the width direction with respect to the upper section of the air conditioning case, it becomes possible to cope merely by a change of the third case, and, due to the shared usage of the first and second cases, manufacturing man-hours and manufacturing costs can be reduced.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Figure 1:
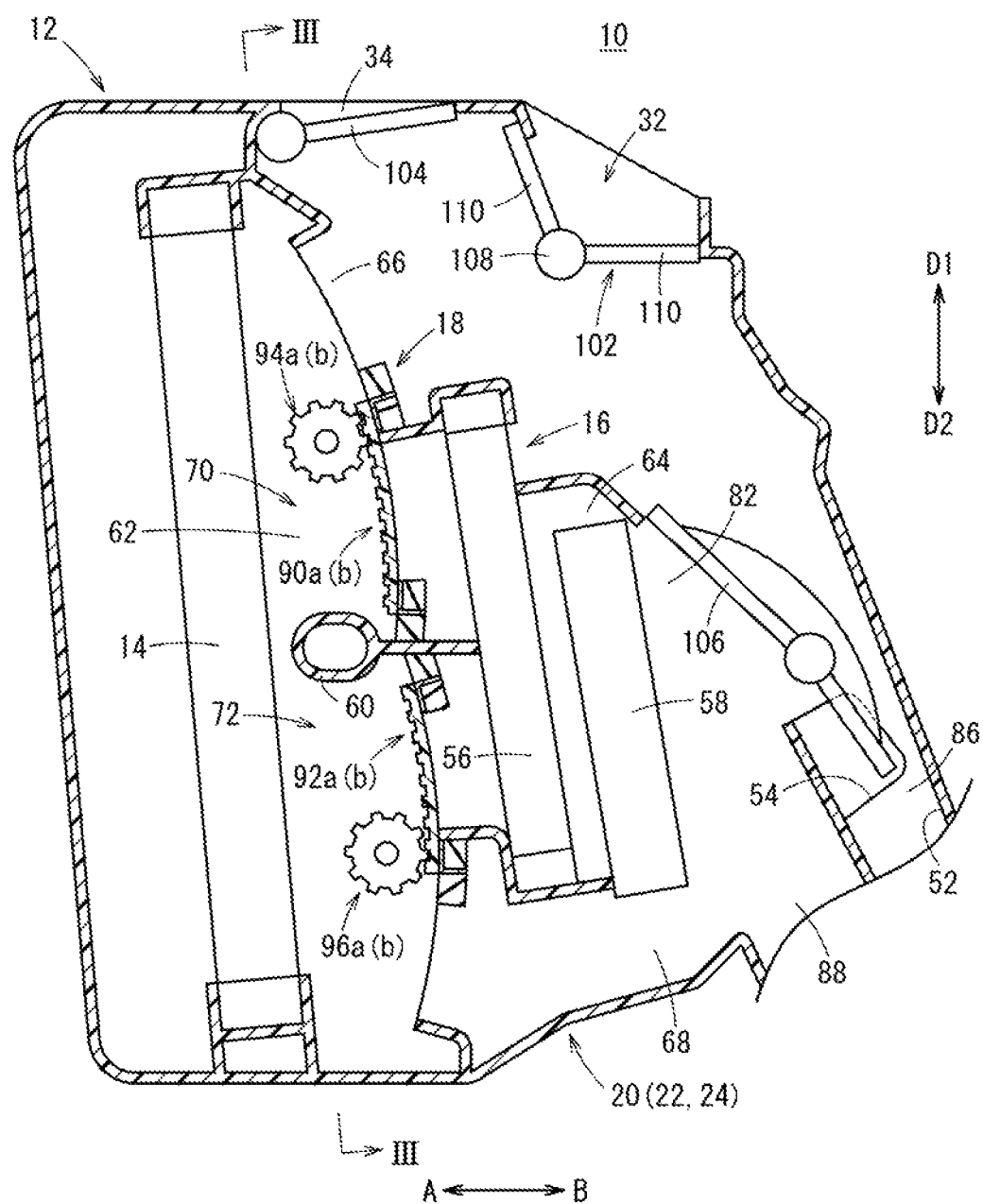
FIG. 1 is an overall cross-sectional view of a vehicular air conditioning device according to a first embodiment of the present invention.

As shown in FIG. 1, this vehicular air conditioning device 10 includes: an air conditioning case 12 that configures each of passages of air; an evaporator (a cooler) 14 that is arranged in the air conditioning case 12 and that cools air; a heating unit (a heater) 16 that heats the air; and a door mechanism 18 that switches a flow of air flowing in each of the passages.

Figure 2:
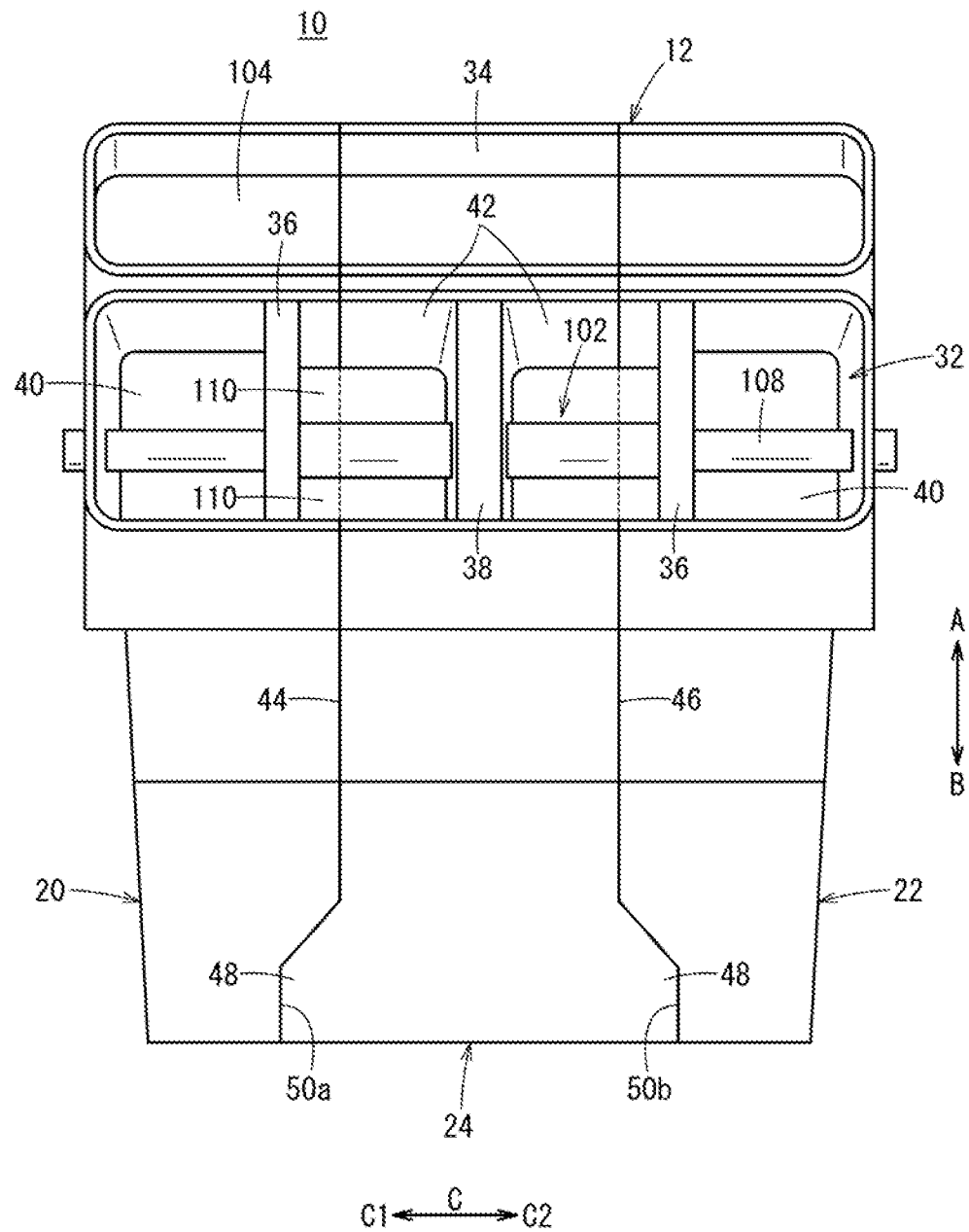
FIG. 2 is an overall plan view in which an air conditioning case in the vehicular air conditioning device of FIG. 1 is viewed from above.
Figure 3:
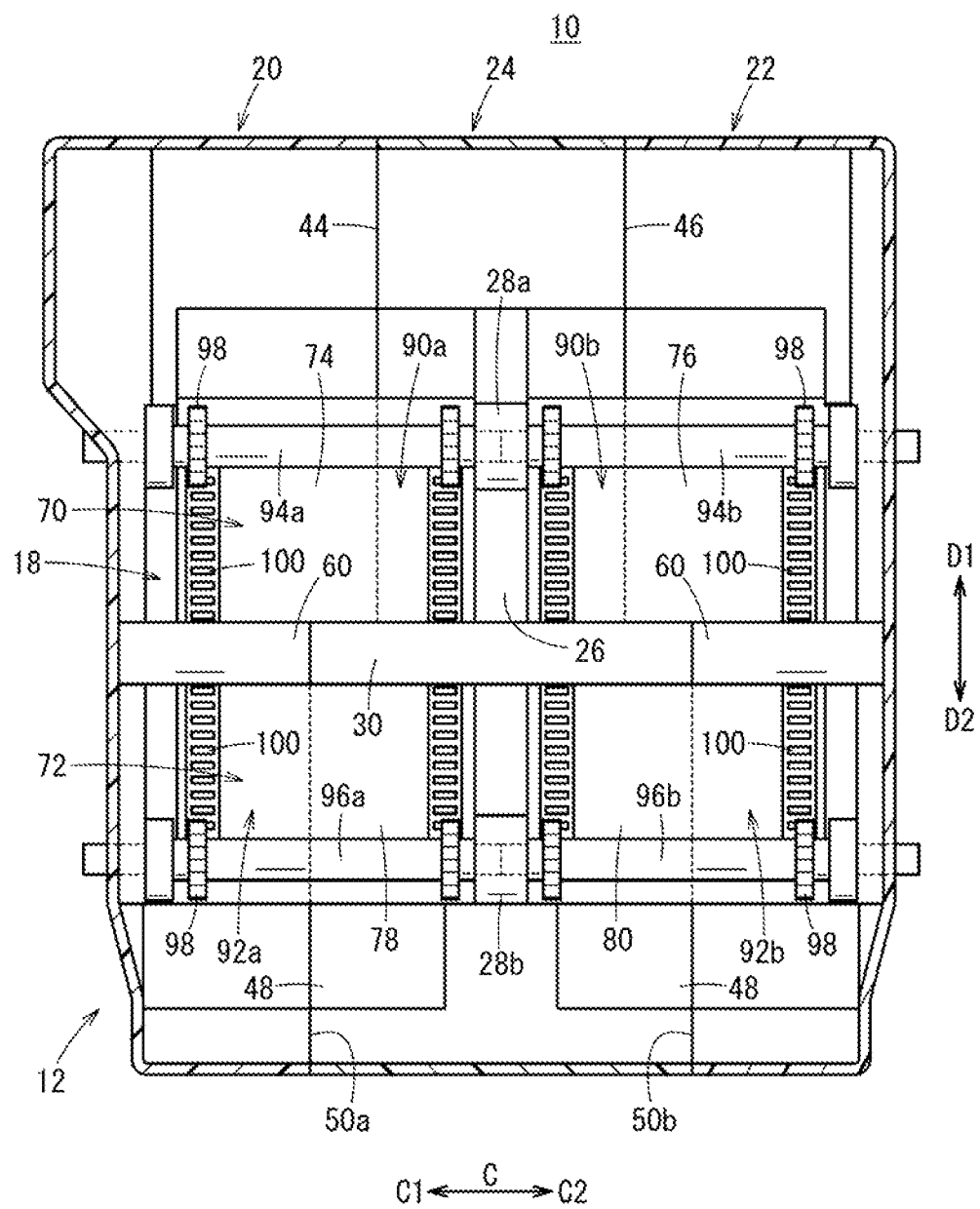
FIG. 3 is a cross-sectional view taken along the line III-III of FIG. 1.

As shown in FIGS. 1 to 3, this air conditioning case 12 is configured from first through third case sections 20, 22, 24 that are capable of being divided in three in a width direction (an arrow C direction in FIG. 2) orthogonal to a front-rear direction of a vehicle (an arrow A direction and an arrow B direction). This first case section (first case) 20 is provided on a one side in the width direction (in an arrow C1 direction), this second case section (second case) 22 is provided on another side in the width direction (in an arrow C2 direction), and this third case section (third case) 24 is sandwiched between the first case section 20 and the second case section 22. That is, the third case section 24 is positioned so as to be at a center in the width direction of the air conditioning case 12. Note that the vehicular air conditioning device 10 is installed such that its first case section 20 is on a driver seat side, and its second case section 22 is on a passenger seat side.

The third case section 24 comprises a separating wall 26 extending in an up-down direction (in an arrow D1 direction and the arrow D2 direction in FIG. 3) at a position in the center in the width direction of the air conditioning case 12, and, in the third case section 24, the inside of the air conditioning case 12 is divided in two in the width direction by the separating wall 26.

A pair of shaft supports 28a, 28b for supporting first shafts 94a, 94b and second shafts 96a, 96b that will be mentioned later are provided separately in the up-down direction in the separating wall 26, and there is formed between one of the shaft supports 28a and another of the shaft supports 28b a boss section 30 that projects toward outer sides in the width direction (in the arrow C1 direction and the arrow C2 direction).

Moreover, on an upper side (in an arrow D1 direction) of the air conditioning case 12, a vent blast port (an opening) 32 and a defroster blast port 34 are open. The vent blast port 32 blasts air to vicinities of faces of occupants of front seats in the vehicle interior. The defroster blast port 34 is adjacent to the vent blast port 32, and blasts air to a vicinity of a front window of the vehicle. Moreover, the vent blast port 32 and the defroster blast port 34 each open along the width direction of the air conditioning case 12 (the arrow C direction) so as to extend over the first through third case sections 20, 22, 24.

As shown in FIG. 2, the vent blast port 32 includes therein: a pair of first partitioning members (partitioning members) 36 close to both end sides in the width direction and formed in the first and second case sections 20, 22; and a second partitioning member 38 formed in the center in the width direction, each being formed orthogonally to the width direction of the vent blast port 32, with the second partitioning member 38 being formed in the third case section 24.

Moreover, the vent blast port 32 is divided in four in the width direction by the first and second partitioning members 36, 38, and is configured from: a pair of side opening sections (outer openings) 40 divided by the first and second case sections 20, 22 and the first partitioning member 36 and formed on both end sides in the width direction; and a pair of center opening sections (a central opening) 42 divided by the first partitioning member 36 and the second partitioning member 38 and formed in the center in the width direction.

The side opening sections 40 are connected to side blast ports (not illustrated) opening in vicinities of side windows on the driver seat side and the passenger seat side in the vehicle interior, and the center opening sections 42 are connected via unillustrated ducts to a center blast port opening between the driver seat and the passenger seat in the vehicle interior.

Moreover, as shown in FIGS. 2 and 3, the first case section 20 and the third case section 24, of the air conditioning case 12 are connected by being fitted to each other via a first dividing section (a fitting position) 44 formed in an end section in the width direction where they oppose. On the other hand, the second case section 22 and the third case section 24, of the air conditioning case 12 are connected by being fitted to each other via a second dividing section (a fitting position) 46 formed in an end section in the width direction where they oppose.

As shown in FIG. 2, the first and second dividing sections 44, 46 are formed linearly from an upper section of the air conditioning case 12 including the vent blast port 32 and the defroster blast port 34 to a lower section of the air conditioning case 12, and are respectively formed so as to be on outer sides in the width direction, that is, on first and second case section 20, 22 sides (in the arrow C1 direction and the arrow C2 direction) with respect to the upper section, on a lower end side facing a later-mentioned lower passage 72.

In other words, the first and second dividing sections 44, 46 are formed in stepped shapes, a lower section of the third case section 24 includes broad projections 48 where width is expanded to outer sides in the width direction with respect to its upper section. Lower sections of the first and second case sections 20, 22 correspondingly include recesses 50a, 50b whose end sections in the width direction on the sides facing the third case section 24 recede toward outer sides in the width direction (in the directions of arrows C1, C2), and are formed in stepped shapes by which the projections 48 are fitted to the recesses 50a, 50b formed on both sides in the width direction.

Furthermore, as shown in FIG. 1, a rear seat side opening 52 that blasts air to a rear seat side of the vehicle interior is formed in a wall section on a rear side (an arrow B direction) in the air conditioning case 12, and front seat heat blast ports 54 that blast air to vicinities of feet of the occupants of the front seats in the vehicle interior are respectively formed in wall sections in the width direction of the first and second case sections 20, 22.

On the other hand, in the air conditioning case 12, the evaporator 14 is provided at a position on an upstream side in a flow direction of air (in an arrow A direction), and the heating unit 16 is provided separated by a certain distance at a position on a downstream side (in the arrow B direction) with respect to the evaporator 14.

This heating unit 16 is configured from, for example: a heater core 56 that heats air by warm water circulating inside; and an electric heater 58 that is provided on a downstream side (in the arrow B direction) of this heater core 56 and that heats under electrifying action. By a heat generating body of this electric heater 58 generating heat based on a control signal from a controller, the electric heater 58 heats passing air to a certain temperature to be supplied to a downstream side.

Moreover, a dividing rib 60 is provided between the evaporator 14 and the heater core 56, in the air conditioning case 12. This dividing rib 60 faces a vicinity of substantially a central section along a height direction (the directions of the arrows D1, D2) of the heater core 56, and is provided between later-mentioned first air-mix doors 90a, 90b and second air-mix doors 92a, 92b of the door mechanism 18, for example. As shown in FIG. 3, the dividing ribs 60 extend along the width direction (in the arrow C direction) in the first and second case sections 20, 22 and are respectively connected to both end sections of the boss section 30 in the third case section 24.

Furthermore, as shown in FIG. 1, the air conditioning case 12 includes on its inside: a cool air passage 62 in which the evaporator 14 is disposed; a warm air passage 64 that is formed on a downstream side of the cool air passage 62, and in which the heating unit 16 is disposed; and a pair of first and second bypass passages 66, 68 that bypass the heating unit 16 on the downstream side of the cool air passage 62.

This first bypass passage 66 extends so as to bypass above (in the arrow D1 direction of) the heater core 56, and this second bypass passage 68 extends so as to bypass below (in the arrow D2 direction of) the heater core 56, each communicating with the downstream side of the cool air passage 62.

Moreover, as shown in FIGS. 1 and 3, an upstream side of the heating unit 16 in the air conditioning case 12 is divided in two in the up-down direction into an upper passage 70 and the lower passage 72 by the dividing rib 60, and the upper passage 70 and the lower passage 72 are further divided in the width direction (the arrow C direction) by the separating wall 26 of the third case section 24 provided in the center in the width direction. As a result, first and second upper flow paths 74, 76 and first and second lower flow paths 78, 80 are configured. That is, a passage is divided in four by the dividing rib 60 and the separating wall 26 of the third case section 24.

In these first and second upper flow paths 74, 76, air flows to be blasted to the vent blast port 32 and the defroster blast port 34 of the air conditioning case 12, and in these first and second lower flow paths 78, 80, air flows to be blasted to the front seat heat blast port 54 and the rear seat side opening 52 of the air conditioning case 12. Moreover, the first upper flow path 74 and the first lower flow path 78 are formed so as to extend in both the first case section 20 and the third case section 24, and the second upper flow path 76 and the second lower flow path 80 are formed so as to extend in both the second case section 22 and the third case section 24.

Moreover, a merging section 82 where cool air flowing in the first and second bypass passages 66, 68 and warm air flowing in the warm air passage 64 merge to be mixed, is formed rearwards of the heating unit 16 in the air conditioning case 12. The front seat heat blast port 54, a rear seat heat passage 86, and a rear seat vent passage 88 are connected to a rear side of the merging section 82.

Moreover, the rear seat heat passage 86 communicates with vicinities of feet on an unillustrated rear seat side of the vehicle interior via unillustrated ducts, and the rear seat vent passage 88 communicates with vicinities of faces on the rear seat side in the vehicle interior via unillustrated ducts.

As shown in FIGS. 1 to 3, the door mechanism 18 comprises, for example: a pair of the first air-mix doors 90a, 90b that are provided between the evaporator 14 and the heater core 56, and that adjust a mixing ratio of cool air and warm air; and a pair of the second air-mix doors 92a, 92b that switch a flowing state of cool air to the second bypass passage 68 on a downstream side of the evaporator 14.

The first air-mix doors 90a, 90b are each formed in a shape of a gently curved plate, and provided so as to be above (in the arrow D1 direction of) the dividing rib 60, and one of the first air-mix doors 90a provided on a first case section 20 side (in the arrow C1 direction in FIG. 3) and another of the first air-mix doors 90b provided on a second case section 22 side (in the arrow C2 direction in FIG. 3) are provided in parallel in the width direction (the arrow C direction). As a result, the first air-mix doors 90a, 90b are disposed so as to respectively face the first and second upper flow paths 74, 76.

The second air-mix doors 92a, 92b are each formed in the same shape as the first air-mix doors 90a, 90b, and provided so as to be below (in the arrow D2 direction of) the dividing rib 60, for example. Moreover, one of the second air-mix doors 92a provided on the first case section 20 side (in the arrow C1 direction) and another of the second air-mix doors 92b provided on the second case section 22 side (in the arrow C2 direction) are provided in parallel in the width direction (the arrow C direction). As a result, the second air-mix doors 92a, 92b are disposed so as to respectively face the first and second lower flow paths 78, 80.

Moreover, the one of the first and one of the second air-mix doors 90a, 92a are provided slidably in the up-down direction (in the directions of the arrows D1, D2) by being sandwiched between the first case section 20 and the third case section 24, and the other of the first and other of the second air-mix doors 90b, 92b are provided slidably in the up-down direction by being sandwiched between the second case section 22 and the third case section 24.

Moreover, the first air-mix doors 90a, 90b and the second air-mix doors 92a, 92b are respectively engaged with a pair of the first shafts 94a, 94b and a pair of the second shafts 96a, 96b supported in a rotatable manner by the air conditioning case 12.

The first shafts 94a, 94b are provided so as to face an upper end of the heater core 56, and be between the first air-mix doors 90a, 90b and the evaporator 14, for example. One of the first shafts 94a is supported in a rotatable manner by a wall section in the width direction of the first case section 20 and the shaft support 28a of the third case section 24, and another of the first shafts 94b is supported in a rotatable manner by a wall section in the width direction of the second case section 22 and the shaft support 28a of the third case section 24. Moreover, pinion gears 98 provided on both ends of the first shafts 94a, 94b are engaged with respective rack gears 100 of the first air-mix doors 90a, 90b.

The second shafts 96a, 96b are provided so as to face a lower end of the heater core 56, and be between the second air-mix doors 92a, 92b and the evaporator 14, for example. One of the second shafts 96a is supported in a rotatable manner by a wall section in the width direction of the first case section 20 and the shaft support 28b of the third case section 24, and another of the second shafts 96b is supported in a rotatable manner by a wall section in the width direction of the second case section 22 and the shaft support 28b of the third case section 24. Moreover, pinion gears 98 provided on both ends of the second shafts 96a, 96b are engaged with respective rack gears 100 of the second air-mix doors 92a, 92b.

As a result of the first shafts 94a, 94b and second shafts 96a, 96b rotating due to a driving force from an unillustrated driving means, the driving force is transmitted to these first air-mix doors 90a, 90b and second air-mix doors 92a, 92b under engaging action of the pinion gears 98 and the rack gears 100, and the first air-mix doors 90a, 90b and second air-mix doors 92a, 92b each undergo sliding displacement in the up-down direction (in the directions of the arrows D1, D2).

Moreover, by the first air-mix doors 90a, 90b sliding in the up-down direction, the first air-mix doors 90a, 90b adjust a flowing ratio to the warm air passage 64 and the first bypass passage 66 of cool air flowing through the first and second upper flow paths 74, 76. On the other hand, by the second air-mix doors 92a, 92b sliding in the up-down direction, the second air-mix doors 92a, 92b adjust a flowing ratio between the warm air passage 64 and the second bypass passage 68 of cool air flowing through the first and second lower flow paths 78, 80.

Moreover, as shown in FIGS. 1 and 2, the door mechanism 18 comprises: a vent switching door (a mode switching door) 102 that adjusts a blast state to the vehicle interior from the vent blast port 32; a defroster switching door 104 that switches a blast state to the front window from the defroster blast port 34; and a heat switching door 106 that opens/closes a heat opening. Moreover, a blast state of warm air to the front seat heat blast port 54 and the rear seat heat passage 86 is switched by the heat switching door 106 revolving.

The vent switching door 102 is configured from: a rotating shaft 108 supported by a wall section in the width direction of the first case section 20 and a wall section in the width direction of the second case section 22; and a pair of door sections 110 extending outwardly in a radial direction from the rotating shaft 108, and the door sections 110 are provided so as to open/close the center opening sections 42 configuring the vent blast port 32.

Moreover, by the vent switching door 102 rotating around the rotating shaft 108, and the door sections 110 abutting on an outer edge section of the center opening section 42 and the first and second partitioning members 36, 38, there is achieved a fully closed state in which the center opening section 42 is blocked (refer to FIG. 1).

The vehicular air conditioning device 10 according to the first embodiment of the present invention basically configured as above will next have its operation and operational advantages described.

First, in the case of performing a heating operation (a heat mode) to blast temperature-adjusted air to vicinities of feet of the occupants, the heat switching door 106 is rotated to be set to an opened state, and the vent switching door 102 is set to a state where the center opening section 42 of the vent blast port 32 is blocked, as a fully closed state.

Cool air that has passed through the evaporator 14 undergoes adjustment of a ratio thereof flowing into the heating unit 16 and the first and second bypass passages 66, 68, by the first air-mix doors 90a, 90b and second air-mix doors 92a, 92b. Then, warm air that has been heated by flowing into the heating unit 16 through the upper passage 70 and lower passage 72 to pass through the heater core 56 and electric heater 58, and cool air that has flowed into the first and second bypass passages 66, 68 to bypass the heating unit 16 merge in the merging section 82 to undergo temperature adjustment.

This temperature-adjusted warm air flows to a rear side from the merging section 82, and is blasted to vicinities of feet of the occupants on a front seat side via the front seat heat blast port 54, and blasted to vicinities of feet of the occupants on a rear seat side from the rear seat heat passage 86. Note that an air blast to vicinities of feet on the rear seat side and an air blast to vicinities of feet on the front seat side are at substantially the same temperature, and that since the side opening sections 40 in the vent blast port 32 are opened, air is blasted to vicinities of the side windows on the driver seat side and the passenger seat side through the side opening sections 40.

Next, in the case of performing a cooling operation (a vent mode) to blast cool air to vicinities of faces of the occupants, the vent switching door 102 is rotated around the rotating shaft 108 and the center opening section 42 of the vent blast port 32 is opened, and, moreover, the heat switching door 106 is rotated to be set to a fully closed state, and, as shown in FIG. 1, the first air-mix doors 90a, 90b are lowered, and the second air-mix doors 92a, 92b are raised to each be set to a state of being abutted on the dividing rib 60.

As a result, cool air that has passed through the evaporator 14 flows into the first and second upper flow paths 74, 76 of the upper passage 70 and the first and second lower flow paths 78, 80 of the lower passage 72, and is then distributed to the first and second bypass passages 66, 68 to flow to the downstream side bypassing the heating unit 16.

Then, cool air flowing along the first bypass passage 66 is blasted to vicinities of faces of the occupants in the front seats through the opened vent blast port 32, and cool air flowing along the second bypass passage 68 flows rearwards through the rear seat vent passage 88, and is then blasted to vicinities of faces of the occupants in the rear seats from an unillustrated blast port.

As indicated above, in the first embodiment, the air conditioning case 12 configuring the vehicular air conditioning device 10 is formed to be dividable in the width direction from: the first and second case sections 20, 22 provided at both ends in the width direction; and the third case section 24 sandwiched between the first case section 20 and the second case section 22, and, on an upper side of the air conditioning case 12, the vent blast port 32 which is opened/closed by the vent switching door 102 opens extending over the first through third case sections 20, 22, 24.

This vent blast port 32 is divided into the pair of side opening sections 40 and the center opening section 42 at the center in the width direction, by the first partitioning members 36 provided in the first and second case sections 20, 22, and the side opening sections 40 are formed so as to enable air to always flow and be blasted to vicinities of windows on the front seat side, regardless of an opened/closed state of the vent switching door 102.

Moreover, in the air conditioning case 12, the first and second dividing sections 44, 46 where the first and second case sections 20, 22 are engaged with the third case section 24 are formed in such a manner that their lower sections facing the lower passage 72 divided in the space between the evaporator 14 and the heating unit 16 are more to outer sides in the width direction than their upper sections where the vent blast port 32 is opened.

Hence, in the vent blast port 32, the side opening sections 40 that are always blasting air to vicinities of the side windows on the driver seat side and the passenger seat side in the vehicle interior are surrounded by the first partitioning members 36, and the first and second dividing sections 44, 46 being dividing surfaces of the third case section 24 and the first and second case sections 20, 22 are disposed in the center opening section 42 where sealing ability during full closure of the vent switching door 102 is required. As a result, even when the air conditioning case 12 is given a structure of being divided in three in the width direction, the rotating shaft 108 of the vent switching door 102 can be certainly held by being sandwiched between the first and second case sections 20, 22 and the third case section 24, and, moreover, sealing ability when the center opening section 42 is blocked by the door sections 110 can be sufficiently secured.

Moreover, in the space between the evaporator 14 and the heating unit 16, the first air-mix doors 90a, 90b are sandwiched in a slidable manner so as to face the first and second upper flow paths 74, 76 that the upper passage 70 has been divided into, and the second air-mix doors 92a, 92b are sandwiched in a slidable manner so as to face the first and second lower flow paths 78, 80 that the lower passage 72 has been divided into, and four air-mix doors, that is, the first air-mix doors 90a, 90b and the second air-mix doors 92a, 92b are configured with the same shape.

As a result, in the above-mentioned kind of vehicular air conditioning device 10 that performs only blasting of air, without performing temperature adjustment of the air, to the rear seat side in the vehicle interior, shared usage can be made of the pair of first air-mix doors 90a, 90b and the pair of second air-mix doors 92a, 92b, hence a greater reduction in manufacturing costs can be achieved compared to when air-mix doors each having a different shape are adopted.

Figure 4:
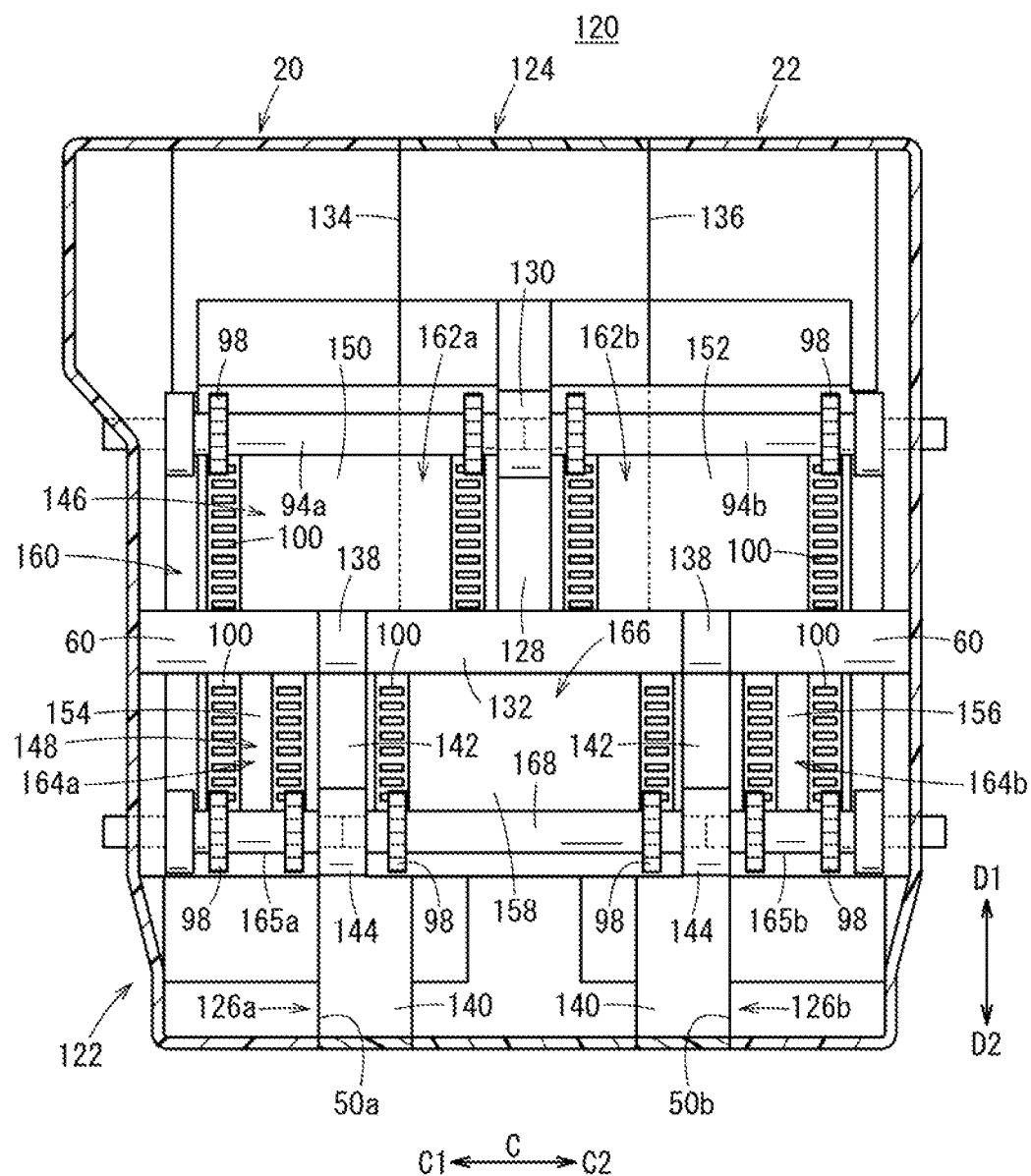
FIG. 4 is a cross-sectional view of a vehicular air conditioning device according to a second embodiment of the present invention.

Next, a vehicular air conditioning device 120 according to a second embodiment is shown in FIG. 4. Note that configuring elements the same as in the above-mentioned vehicular air conditioning device 10 according to the first embodiment will be assigned with the same reference symbols as in the first embodiment, and detailed descriptions thereof will be omitted.

This vehicular air conditioning device 120 according to the second embodiment differs from the vehicular air conditioning device 10 according to the first embodiment in having a rear seat temperature adjustment function enabling adjustment of temperature of air blasted to the rear seat side of the vehicle interior, and in including a third air-mix door 166 for performing temperature adjustment of an air blast to the rear seat side in an air conditioning case 122.

As shown in FIG. 4, the vehicular air conditioning device 120 is configured from first through third case sections 20, 22, 124 enabling its air conditioning case 122 to be divided in three in the width direction (the arrow C direction), and these first and second case sections 20, 22 are formed with the same shapes as, and have shared usage with the above-mentioned first and second case sections 20, 22 of the vehicular air conditioning device 10 in the first embodiment, hence are assigned with the same reference symbols as in the first embodiment.

Moreover, demarcation members 126a, 126b are respectively sandwiched between the first case section 20 and third case section 124, and between the second case section 22 and third case section 124, on a lower side of the air conditioning case 122 facing a later-mentioned lower passage 148.

The third case section 124 comprises a separating wall 128 extending in the up-down direction (the directions of the arrows D1, D2) at a position in a center in the width direction of the air conditioning case 122. The inside of the air conditioning case 122 is divided in two in the width direction (the arrow C direction) by this separating wall 128, and this separating wall 128 comprises: a shaft support 130 for supporting the first shafts 94a, 94b (mentioned below); and a boss section 132 which is formed at a lower end of the separating wall 128 and projects in the width direction (the arrow C direction).

Moreover, the third case section 124 includes: a first dividing section 134 connected to the first case section 20; and a second dividing section 136 connected to the second case section 22, with the first and second dividing sections 134, 136 being each formed substantially linearly along the up-down direction of the air conditioning case 122.

The demarcation members 126a, 126b are formed extending in the up-down direction, are respectively provided in the recesses 50a, 50b of the first and second case sections 20, 22 facing the lower passage 148 of the air conditioning case 122, and are provided separated from each other in the width direction (the arrow C direction), for example. The demarcation members 126a, 126b each include: a first holding section 138 formed at their upper ends; a second holding section 140 formed at their lower ends; a demarcation wall 142 that joins the first holding section 138 and the second holding section 140; and a support shaft section 144 provided in the demarcation wall 142.

Moreover, widths of the demarcation members 126a, 126b are formed substantially equally to the widths of the recesses 50a, 50b in the first and second case sections 20, 22, and, by the demarcation members 126a, 126b being engaged with the recesses 50a, 50b, it results in the demarcation members 126a, 126b and end sections in the width direction of the first and second case sections 20, 22 being substantially in a straight line.

Moreover, the demarcation members 126a, 126b are respectively engaged with the recesses 50a, 50b of the first and second case sections 20, 22, and the first holding sections 138 are respectively sandwiched between the dividing rib 60 of the first case section 20 and boss section 132 of the third case section 124, and between the dividing rib 60 of the second case section 22 and boss section 132 of the third case section 124. On the other hand, the second holding sections 140 are held by being respectively sandwiched between the lower end of the first case section 20 and lower side of the third case section 124, and between the lower end of the second case section 22 and lower side of the third case section 124.

As a result, the demarcation members 126a, 126b are disposed in such a manner that their demarcation walls 142 are substantially parallel to the separating wall 128 of the third case section 124 and wall sections in the width direction of the first and second case sections 20, 22.

Moreover, in the air conditioning case 122, there are provided an upper passage 146 and the lower passage 148 divided in two upwardly/downwardly by the dividing ribs 60 disposed between the evaporator 14 and the heater core 56. The upper passage 146 is divided in two in the width direction (the arrow C direction) into a first upper flow path 150 and a second upper flow path 152 by the separating wall 128 of the third case section 124 provided in the center in the width direction.

On the other hand, the lower passage 148 is divided in three by the pair of demarcation members 126a, 126b, and is configured from: a first lower flow path 154 formed on the first case section 20 side (in the arrow C1 direction); a second lower flow path 156 formed on the second case section 22 side (in the arrow C2 direction); and a third lower flow path 158 formed between the demarcation members 126a, 126b.

Furthermore, in the air conditioning case 122, there is provided a door mechanism 160 that switches a flow of air flowing along each of the passages, and this door mechanism 160 comprises: a pair of first air-mix doors 162a, 162b; a pair of second air-mix doors 164a, 164b provided below (in the arrow D2 direction of) the first air-mix doors 162a, 162b; and the third air-mix door 166 provided between one of the second air-mix doors 164a and another of the second air-mix doors 164b in the width direction. That is, the door mechanism 160 has five air-mix doors.

The first air-mix doors 162a, 162b are provided so as to be above (in the arrow D1 direction of) the dividing ribs 60, with one of the first air-mix doors 162a and another of the first air-mix doors 162b being in parallel in the width direction (the arrow C direction). Moreover, the first air-mix doors 162a, 162b are respectively provided so as to face the first and second upper flow paths 150, 152.

The second air-mix doors 164a, 164b have their widths formed smaller than those of the first air-mix doors 162a, 162b, and are provided so as to be below (in the arrow D2 direction of) the dividing ribs 60, with the one of the second air-mix doors 164a and the other of the second air-mix doors 164b being disposed in parallel in the width direction (the arrow C direction). Moreover, the second air-mix doors 164a, 164b are respectively provided so as to face the first and second lower flow paths 154, 156.

The third air-mix door 166 is formed in the same shape as the first air-mix doors 162a, 162b, is disposed below the first air-mix doors 162a, 162b, and is provided at the center in the width direction of the air conditioning case 122 so as to face the third lower flow path 158. That is, the pair of second air-mix doors 164a, 164b are provided on outer sides in the width direction of the third air-mix door 166.

Moreover, in the lower passage 148, the one of the second air-mix doors 164a is provided slidably in the up-down direction by being sandwiched between one of the demarcation members 126a and the first case section 20, and the other of the second air-mix doors 164b is provided slidably in the up-down direction by being sandwiched between another of the demarcation members 126b and the second case section 22.

The third air-mix door 166 is provided slidably in the up-down direction by being sandwiched between the one of the demarcation members 126a and the other of the demarcation members 126b.

Moreover, the first air-mix doors 162a, 162b are respectively engaged with the first shafts 94a, 94b, and the first shafts 94a, 94b are respectively supported in a rotatable manner between the first case section 20 and shaft support 130 of the third case section 124, and between the second case section 22 and shaft support 130 of the third case section 124.

The second air-mix doors 164a, 164b are respectively engaged with second shafts 165a, 165b, and the second shafts 165a, 165b are respectively supported in a rotatable manner between the first case section 20 and support shaft section 144 of the demarcation member 126a, and between the second case section 22 and support shaft section 144 of the demarcation member 126b.

Furthermore, the third air-mix door 166 is engaged with a third shaft 168 supported in a rotatable manner between the support shaft section 144 of the one of the demarcation members 126a and the support shaft section 144 of the other of the demarcation members 126b. That is, the demarcation members 126a, 126b support the second shafts 165a, 165b and third shaft 168 in a rotatable manner, by means of the support shaft sections 144 of the demarcation members 126a, 126b.

Moreover, as a result of the first shafts 94a, 94b, second shafts 165a, 165b, and third shaft 168 respectively rotating due to a driving force from an unillustrated driving means, the driving force is transmitted to the above-mentioned first air-mix doors 162a, 162b, second air-mix doors 164a, 164b, and third air-mix door 166 under engaging action of the pinion gears 98 and the rack gears 100, and the first air-mix doors 162a, 162b, second air-mix doors 164a, 164b, and third air-mix door 166 each undergo sliding displacement in the up-down direction (the directions of the arrows D1, D2).

By the first air-mix doors 162a, 162b sliding in the up-down direction, the first air-mix doors 162a, 162b adjust a flowing ratio between the warm air passage 64 and the first bypass passage 66 of cool air flowing through the first and second upper flow paths 150, 152. On the other hand, by the second air-mix doors 164a, 164b sliding in the up-down direction, the second air-mix doors 164a, 164b adjust a flowing ratio between the warm air passage 64 and the second bypass passage 68 of warm air flowing through the first and second lower flow paths 154, 156.

Moreover, by the third air-mix door 166 sliding in the up-down direction, the third air-mix door 166 adjusts a flowing ratio between the warm air passage 64 and the second bypass passage 68 of warm air flowing through the third lower flow path 158, and temperature of air blasted to the rear seat heat passage 86 on the rear seat side is adjusted.

As indicated above, in the second embodiment, the air conditioning case 122 configuring the vehicular air conditioning device 120 is formed to be dividable in the width direction from: the first and second case sections 20, 22 provided at both ends in the width direction; and the third case section 124 sandwiched between the first case section 20 and the second case section 22, the vent blast port 32 opened on an upper side of the air conditioning case 122 is formed so as to extend over the first through third case sections 20, 22, 124, and the side opening sections 40 of the air conditioning case 122 are formed so as to enable air to always flow, regardless of an opened/closed state of the vent switching door 102 that opens/closes the vent blast port 32.

Moreover, in the air conditioning case 122, the first and second dividing sections 134, 136 where the first and second case sections 20, 22 are engaged with the third case section 124 are formed in such a manner that their lower sections facing the lower passage 148 divided upwardly/downwardly in the space between the evaporator 14 and the heating unit 16 are more to outer sides in the width direction than their upper sections where the vent blast port 32 is opened.

Hence, in the vent blast port 32, the side opening sections 40 that are always blasting air to vicinities of the side windows on the driver seat side and the passenger seat side in the vehicle interior are surrounded by the first partitioning members 36, and the first and second dividing sections 134, 136 being dividing surfaces of the third case section 124 and the first and second case sections 20, 22 are disposed in the center opening section 42 where sealing ability during full closure of the vent switching door 102 is required. As a result, even when the air conditioning case 122 is given a structure of being divided in three in the width direction, the rotating shaft 108 of the vent switching door 102 can be certainly held by being sandwiched between the first and second case sections 20, 22 and the third case section 124, and, moreover, sealing ability when the center opening section 42 is blocked by the door sections 110 can be sufficiently secured.

Moreover, in the case of aiming to achieve shared usage of the first and second case sections 20, 22 configuring the air conditioning cases 12, 122, between the above-mentioned kind of vehicular air conditioning device 120 that has the rear seat temperature adjustment function (the third air-mix door 166) for adjusting temperature of air blasted to the rear seats and the vehicular air conditioning device 10 of the first embodiment that performs only blasting of air to the rear seats and does not adjust temperature of the blasted air, in the vehicular air conditioning device 120, the first and second dividing sections 134, 136 where the first and second case sections 20, 22 are engaged with the third case section 124 are formed in such a manner that their lower sections facing the lower passage 148 are more to outer sides in the width direction than their upper sections where the vent blast port 32 is opened.

In other words, positions of the first and second dividing sections 134, 136 are set on outer sides in the width direction so as to match a width of the third air-mix door 166 provided in the third case section 124.

Therefore, the third air-mix door 166 provided so as to face the lower passage 148 can be sandwiched between the pair of demarcation members 126a, 126b, and the pair of second air-mix doors 164a, 164b provided on outer sides in the width direction of the third air-mix door 166 can be sandwiched between the demarcation members 126a, 126b and the first and second case sections 20, 22.

As a result, in the two vehicular air conditioning devices of differing specifications, that is, the vehicular air conditioning device 120 having the rear seat temperature adjustment function and the vehicular air conditioning device 10 not having the rear seat temperature adjustment function, by setting positions of the first dividing section 134 (44) and the second dividing section 136 (46) to be on outer sides in the width direction in the lower section of the air conditioning case 122, it is possible for shared usage of the first and second case sections 20, 22, to be achieved with only the third case section 124 being replaced, and it is possible for manufacturing man-hours and manufacturing costs of the vehicular air conditioning device to be reduced.

In other words, while, in the air conditioning case 12 of the vehicular air conditioning device 10, in order that areas of the side opening sections 40 are secured, the first and second dividing sections 44, 46 are provided so as to be on outer sides in the width direction with respect to the first partitioning members 36, on the other hand, in specifications enabling temperature adjustment of the rear seats, in order that the third air-mix door 166 provided in the center in the width direction of the lower passage 148 can be sandwiched, positions of the first and second dividing sections 134, 136 are disposed more to the outer sides in the width direction on a lower section side facing the lower passage 148 than in an upper section.

Moreover, in the space between the evaporator 14 and the heating unit 16 in the air conditioning case 122, the pair of first air-mix doors 162a, 162b are provided in a slidable manner so as to face the first and second upper flow paths 150, 152 that the upper passage 146 has been divided into, and the pair of second air-mix doors 164a, 164b are provided in a slidable manner so as to face the first and second lower flow paths 154, 156 that the lower passage 148 has been divided into, and, moreover, the third air-mix door 166 is sandwiched by the demarcation members 126a, 126b to be provided in a slidable manner so as to face the third lower path 158, and the first air-mix doors 162a, 162b and third air-mix door 166 are configured with the same shape.

As a result, in the above-mentioned kind of vehicular air conditioning device 120 that enables temperature of air blasted to the rear seat side in the vehicle interior to be adjusted under opening/closing action of the third air-mix door 166, shared usage can be made of the pair of first air-mix doors 162a, 162b and the third air-mix door 166, hence an even greater reduction in manufacturing costs can be achieved compared to when the air-mix doors have each been given a different shape.

Furthermore, by giving the same shape to the pair of second air-mix doors 164a, 164b that open/close the first and second lower paths 154, 156, shared usage of the second air-mix doors 164a, 164b can be made, in addition to the above-mentioned shared usage of the first air-mix doors 162a, 162b and third air-mix door 166, and it becomes possible for a further reduction in manufacturing costs to be achieved.

Note that the vehicular air conditioning device according to the present invention is not limited to the above-mentioned embodiments and may of course adopt a variety of configurations without departing from the gist of the present invention.

What is claimed is:

1. A vehicular air conditioning device that comprises an air conditioning case, the air conditioning case including a passage where air flows, and including a cooler and a heater housed therein so as to face the passage, the air conditioning case being formed to be dividable in a width direction of the cooler orthogonal to a flowing direction of the air, and being configured from first and second cases configuring both ends in the width direction of the air conditioning case and a third case sandwiched between the first case and the second case, a space between the cooler and the heater in the air conditioning case being divided into an upper passage and a lower passage, an opening that communicates downstream of the upper passage and a vehicle interior and that is formed in an upper section of the air conditioning case so as to extend over the first case, the second case, and the third case, the opening being provided with a mode switching door configured to open/close, the opening being partitioned in the width direction and forming a pair of outer openings and a central opening, by partitioning members provided in the first and second cases, the first case including:
  a first upper fitting portion positioned at an upper part of the first case having the opening, the first upper fitting portion being fitted to the third case in the width direction of the air conditioning case;
  a first side portion positioned at the upper part of the first case and on a side of the first case opposite to the first upper fitting portion in the width direction; and
  a first lower fitting portion positioned at a lower part of the first case having the lower passage, the first lower fitting portion being fitted to the third case in the width direction of the air conditioning case, the second case including:
  a second upper fitting portion positioned at an upper part of the second case having the opening, the second upper fitting portion being fitted to the third case in the width direction of the air conditioning case;
  a second side portion positioned at the upper part of the second case and on a side of the second case opposite to the second upper fitting portion in the width direction; and
  a second lower fitting portion positioned at a lower part of the second case having the lower passage, the second lower fitting portion being fitted to the third case in the width direction of the air conditioning case, the first lower fitting portion is arranged between the first side portion and the first upper fitting portion in the width direction of the air conditioning case, and the second lower fitting portion is arranged between the second side portion and the second upper fitting portion in the width direction of the air conditioning case.

2. The vehicular air conditioning device according to claim 1, wherein
  the pair of outer openings are formed so that the air is always flowable, regardless of an opened/closed state of the mode switching door.

3. The vehicular air conditioning device according to claim 1, wherein
  the air conditioning case has the upper passage and the lower passage partitioned in the width direction by the third case, and comprises: a first upper flow path and first lower flow path formed by the first case and the third case; and a second upper flow path and second lower flow path formed by the second case and the third case,
  a plurality of air-mix doors respectively opening/closing the first upper flow path, the first lower flow path, the second upper flow path, and the second lower flow path are sandwiched by the first case, the second case, and the third case, in the space between the cooler and the heater, and
  lengths in the width direction of the air-mix doors are each formed the same.

4. The vehicular air conditioning device according to claim 1, wherein
  the air conditioning case has the upper passage partitioned in the width direction by the third case, and comprises: a first upper flow path formed by the first case and the third case; and a second upper flow path formed by the second case and the third case,
  the vehicular air conditioning device comprises a pair of demarcation members respectively sandwiched between the first and second cases and the third case, and the lower passage comprises: a first lower flow path divided by the first case and one of the demarcation members; a second lower flow path divided by the second case and another of the demarcation members; and a third lower flow path formed between the one of the demarcation members and the other of the demarcation members,
  a plurality of air-mix doors respectively opening/closing the first upper flow path, the first lower flow path, the second upper flow path, the second lower flow path, and the third lower flow path are sandwiched by the first case, the second case, the third case, and the demarcation members, in the space between the cooler and the heater, and
  lengths in the width direction of the air-mix doors that open/close the first upper flow path, the second upper flow path, and the third lower flow path, of the air-mix doors are each formed same.

5. The vehicular air conditioning device according to claim 4, wherein
  lengths in the width direction of the air-mix doors that open/close the first lower flow path and the second lower flow path, of the air-mix doors are each formed same.

* * * * *